(12) United States Patent
Jury

(10) Patent No.: US 9,099,158 B1
(45) Date of Patent: Aug. 4, 2015

(54) MULTI-TRACK SIGNAL DIPULSE EXTRACTION

(71) Applicant: Seagate Technology LLC, Cupertino, CA (US)

(72) Inventor: Jason Charles Jury, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/048,857

(22) Filed: Oct. 8, 2013

(51) Int. Cl.
  G11B 5/02 (2006.01)
  G11B 20/12 (2006.01)
  G11B 20/10 (2006.01)

(52) U.S. Cl.
  CPC ...... *G11B 20/1217* (2013.01); *G11B 20/10046* (2013.01); *G11B 20/10222* (2013.01); *G11B 20/10324* (2013.01)

(58) Field of Classification Search
  None
  See application file for complete search history.

(56) References Cited

U.S. PATENT DOCUMENTS

| | | | |
|---|---|---|---|
| 6,151,177 A | 11/2000 | Shrinkle et al. | |
| 6,208,477 B1 * | 3/2001 | Cloke et al. | 360/31 |
| 6,400,518 B1 | 6/2002 | Bhaumik et al. | |
| 6,519,106 B1 | 2/2003 | Goh et al. | |
| 6,587,292 B1 | 7/2003 | Ashley et al. | |
| 6,967,808 B1 * | 11/2005 | Bandic et al. | 360/77.08 |
| 7,012,772 B1 | 3/2006 | Vis | |
| 7,092,180 B2 | 8/2006 | Franck | |
| 7,126,890 B2 * | 10/2006 | Learned et al. | 369/44.32 |
| 7,170,704 B2 * | 1/2007 | DeGroat et al. | 360/53 |
| 7,193,800 B2 * | 3/2007 | Coker et al. | 360/48 |
| 7,428,120 B2 * | 9/2008 | Berman et al. | 360/77.01 |
| 7,616,707 B2 * | 11/2009 | Jin | 375/316 |
| 7,643,238 B2 * | 1/2010 | DeGroat | 360/65 |
| 8,077,427 B2 * | 12/2011 | Mathew et al. | 360/75 |
| 8,130,462 B2 | 3/2012 | Marrow | |
| 8,149,529 B2 * | 4/2012 | Mathew et al. | 360/46 |
| 8,300,339 B1 * | 10/2012 | Nangare et al. | 360/39 |
| 8,339,722 B1 * | 12/2012 | Wu et al. | 360/46 |
| 8,378,731 B1 | 2/2013 | Tang et al. | |
| 8,411,383 B2 | 4/2013 | Cao et al. | |
| 8,422,161 B2 * | 4/2013 | Cassuto et al. | 360/77.08 |
| 8,441,751 B1 * | 5/2013 | Song et al. | 360/45 |

(Continued)

FOREIGN PATENT DOCUMENTS

| | | |
|---|---|---|
| EP | 0684484 | 11/1995 |
| EP | 0830669 | 3/2004 |

(Continued)

OTHER PUBLICATIONS

Palmer, et al., "Identification of Nonlinear Write Effects Using Pseudorandom Sequences," IEEE Transactions on Magnetics, vol. MAG-23, No. 5, Sep. 1987.

(Continued)

*Primary Examiner* — Dismery Mercedes
(74) *Attorney, Agent, or Firm* — Crawford Maunu PLLC

(57) ABSTRACT

Certain exemplary aspects of the present disclosure are directed towards an apparatus in which a data-access head is used to access a sequence of data stored in adjacent ones of multiple tracks of a data-storage device, where the sequence of data includes a stochastic or pseudo-random set of bits and on an adjacent one of the multiple tracks, the sequence of bits is represented in a phase-shifted form. The data access of the multiple tracks bits is used to characterize nonlinear interaction therebetween.

15 Claims, 3 Drawing Sheets

(56) References Cited

U.S. PATENT DOCUMENTS

| | | | |
|---|---|---|---|
| 8,441,752 B1* | 5/2013 | Song et al. | 360/45 |
| 8,638,513 B1* | 1/2014 | Burd | 360/39 |
| 8,665,543 B2* | 3/2014 | Bellorado et al. | 360/45 |
| 8,947,801 B1* | 2/2015 | Jury | 360/25 |
| 2007/0041115 A1* | 2/2007 | Lee | 360/31 |
| 2007/0076313 A1 | 4/2007 | Hutchins et al. | |
| 2008/0151704 A1* | 6/2008 | Harada | 369/30.22 |

FOREIGN PATENT DOCUMENTS

| | | |
|---|---|---|
| EP | 1739674 | 1/2007 |
| WO | WO0048173 | 8/2000 |

OTHER PUBLICATIONS

Palmer, et al. "Characterization of the Read/Write Process for Magnetic Recording," IEEE Transactions on Magnetics. vol. 31 No. 2. Mar. 1995.

R. Hermann, "Volterra Modeling of Digital Magnetic Saturation Recording Channels," IEEE Transactions on Magnetics, vol. 26, No. 5, Sep. 1990.

Robert D. Nowak, "Volterra Filter Identification Using Penalized Least Squares," Acoustics, Speech, and Signal Processing, May 1996. ICASSP-96. Conference Proceedings., 1996 IEEE International Conference on IEEE, 2813-2816, vol. 5.

* cited by examiner

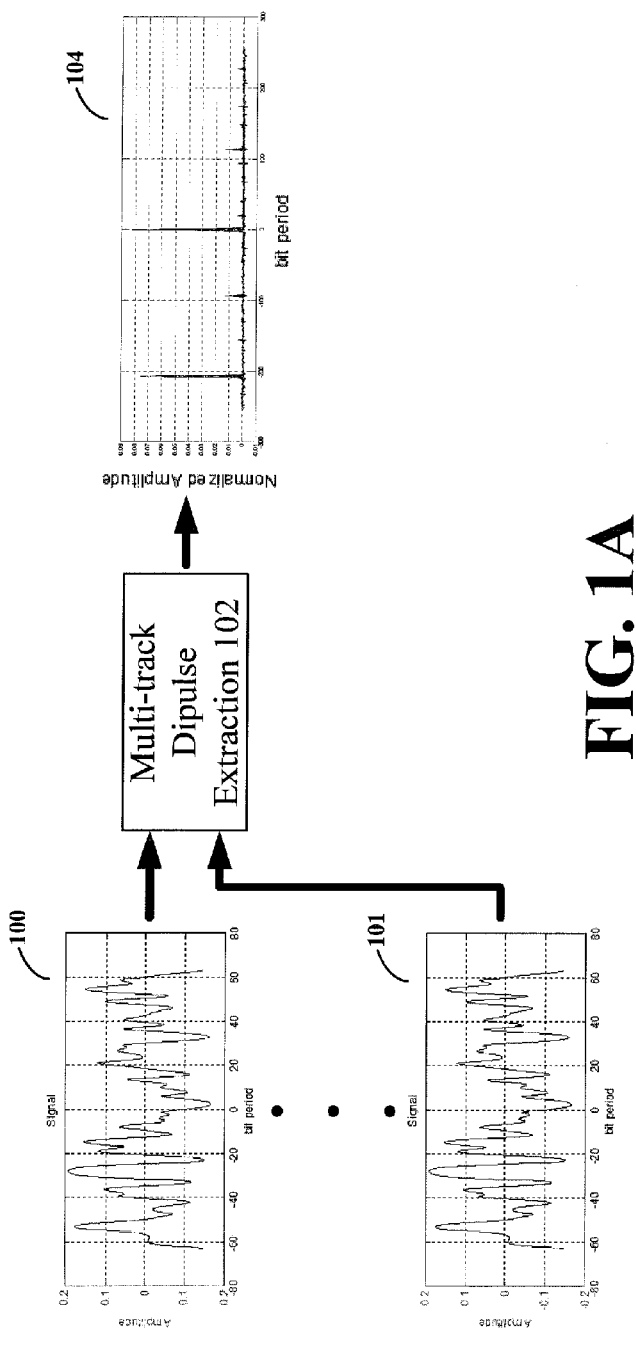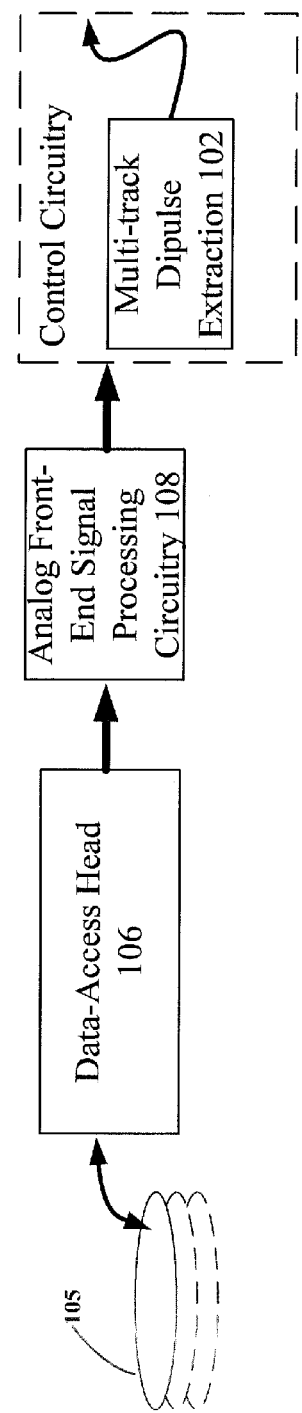
FIG. 1A
FIG. 1B

MULTI-TRACK SIGNAL DIPULSE EXTRACTION

SUMMARY

Various example embodiments are directed to methods and/or apparatuses that involve accessing a sequence of data, including a stochastic or pseudo-random set of bits, on a first track of a data-storage device, and also accessing phase-shifted representations of the set of bits on an adjacent track. This data is accessed to provide or characterize nonlinear interaction between the adjacent track and the first track.

Consistent with various other embodiments and aspects of the present disclosure, a multiple track data-access method is disclosed. The method involves accessing a sequence of data on a first track of the multiple tracks of a data-storage device, wherein the sequence includes a random or pseudo-random set of bits. By also accessing phase-shifted representations of the data sequence on an adjacent track, the accessed data is used to provide or characterize nonlinear interaction between the adjacent tracks. An output signal, as provided in response to the nonlinear interactions, represents an asymmetry correction coefficient of each track. The output signal is based on a signal dipulse of the multiple tracks that is a function of cross correlated and aggregated signals corresponding to the random or pseudo-random set of bits and to their phase-shifted representations.

Consistent with yet further embodiments, other aspects are directed toward an apparatus that includes a mechanism, circuit or assembly that includes a data-access head and that is configured to access a sequence of data, including a stochastic or pseudo-random set of bits, on a first track of a data-storage device. The same or another mechanism, circuit or assembly is configured to access phase-shifted representations of the set of bits on an adjacent track. The apparatus further involves providing or characterizing nonlinear interaction between the adjacent track and the first track.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 1A is a block diagram of a multi-track signal dipulse extraction circuit with exemplary input signals and the resulting output signal, consistent with various aspects of the present disclosure;

FIG. 1B is a partial block diagram of a disc drive environment, consistent with various aspects of the present disclosure;

Figure 2:
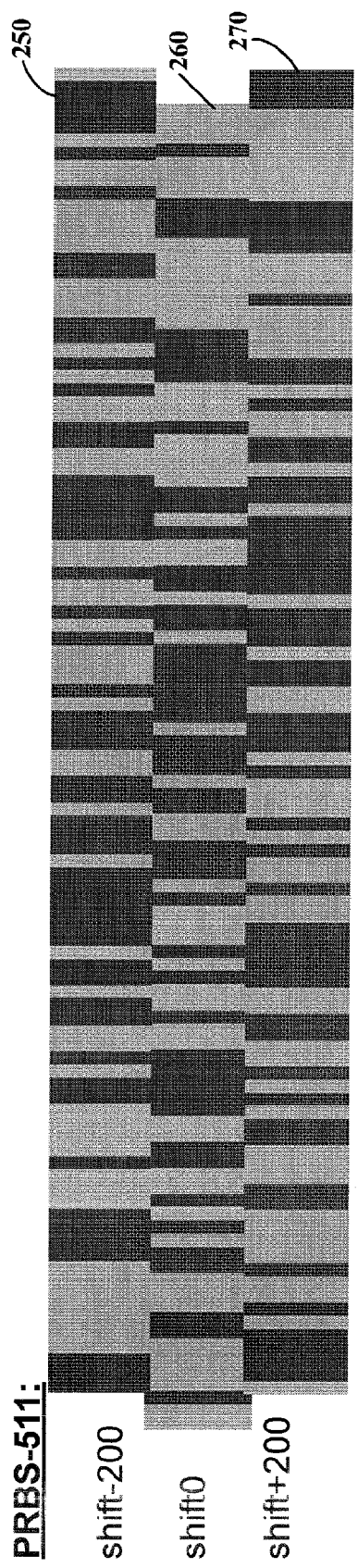
FIG. 2 is a pseudo-random bit sequence of data written to three adjacent data tracks phase-shifted relative one another, consistent with various aspects of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

DETAILED DESCRIPTION

Aspects of the present invention are believed to be applicable to a variety of different types of methods, devices, systems and arrangements that store data in data storage devices, such as magnetic media, which are susceptible to asymmetric noise or interference from adjacently-stored data such as data that is stored in tracks of discs and read by magneto-resistive transducers. Specific embodiments are believed to be particularly beneficial to a disc drive apparatus as described above. While the present disclosure is not necessarily so limited, various aspects thereof may be appreciated through a discussion of examples using this context.

For instance, in certain embodiments of the present disclosure, data is accessed via a multiple-track dipulse extraction circuit, which processes, corresponds to and/or contains a readback signal. The (so-called) readback signal is presented in various forms including an analog form that is raw or cleansed (e.g., smoothed or otherwise filtered to some degree) and including a digital form (e.g., using high-resolution samples) that might also be raw or somewhat cleansed. The readback signal represents data stored in at least one of multiple tracks on a disc of a disc drive. A circuit for presenting the readback signal is an active (e.g., an amplifier or another transistor-based signal-drive circuit) or passive circuit (e.g., a passive signal-coupling electrode) that is a part of, or connected to, a data-access head.

Certain aspects of the present disclosure are used in connection with, for example, disc-drive applications. For instance, a data extraction circuit, consistent with various aspects of the present disclosure, uses a readback signal as provided by a data-access head (e.g., read head/transducer). The data-access head presents the readback signal by detecting, in a time sequence, the alterations on a medium, such as a disc, and generating a sequence of corresponding pulses in an analog form. These pulses are then detected and decoded by read channel circuitry in order to reproduce a digital sequence corresponding to digital data as stored in a track or tracks of the disc. Discrete time sequence detectors can be advantageous for presenting a cleansed and shaped digital version of the readback signal. The detectors compensate for intersymbol interference (ISI), and are less susceptible to channel noise than other types of detectors. Discrete time sequence detection, such as discrete time pulse detection, maximum likelihood sequence detection, Viterbi detection, decision-feedback equalization, and variations of these including combinations thereof, can be used for presenting a somewhat cleansed and shaped digital version of the readback signal.

Various aspects of the present disclosure are directed toward a multiple-track dipulse extraction circuit that identifies asymmetry and non-linearities in the readback signal of the read data. The read data is stored in at least one of the multiple tracks. The asymmetry and non-linearities in the readback signal are identified by generating a signal dipulse for each track, and cross-correlating and aggregating the signal dipulse for multiple adjacent tracks. In response to the non-linear interaction, an asymmetry correction coefficient is provided for each track that reduces or nulls any asymmetry. Asymmetry includes, but is not necessarily so limited to, non-linear interactions, asymmetry echoes, saturation and mixing echoes caused by the target track and adjacent tracks. Thus, correction data of this type can be used for various purposes including but not limited to identifying, reducing, and/or removing such asymmetry and non-linearities.

Figure 3A:
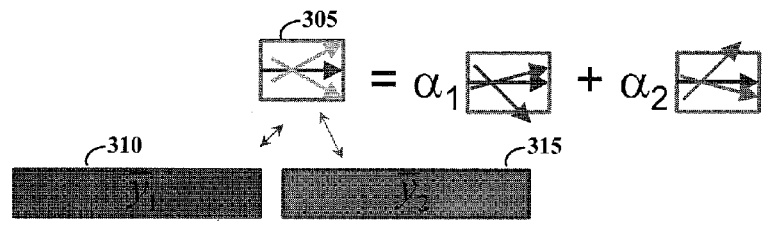
FIG. 3A is a diagram illustrating the isolated track stray magnetic fields underlying the ostensibly symmetric response of the magneto-resistive read head to the magnetic media data, consistent with various aspects of the present disclosure.

The following discussion provides various example approaches and aspects involving the determination of the correction coefficients for respective ones of the multiple tracks. In each example, non-linear interactions between multiple adjacent tracks are characterized in response to the readback signal and using multi-track dipulse extraction circuitry and related methodologies. These approaches and aspects can be carried out and implemented, alone or together in various combinations thereof, using one or more of the components as shown in FIGS. 1A, 1B, 3A, and as otherwise described herein. Some of these example embodiments are directed to methods of using a data-access head to access data stored in multiple-tracks of a data-storage device, and signal processing methods for the accessed data.

According to one such example embodiment, a data-access head provides a readback signal, characteristic of the data accessed and stored in multiple tracks of a data-storage device, for determining and/or assessing nonlinear interactions between the tracks. A sequence of data (including a stochastic or pseudo-random set of bits) on a first track of the multiple tracks of the data-storage device is accessed. Additionally, on another of the multiple tracks, adjacent to the first track, phase-shifted representations of the bits of the stochastic or pseudo-random set of bits are accessed to characterize nonlinear interactions between the other of the multiple tracks that is adjacent to the first track.

In certain embodiments of the present disclosure, the readback signal provided by the data-access head is used to generate a signal dipulse corresponding to the data as accessed in the multiple tracks. Such a signal dipulse can be provided in various ways including, for example, by executing an algorithm through which a related set of signals on the multiple tracks are cross correlated. The related set of signals correspond to a stochastic or pseudo-random set of bits, as previously stored on the disc, accessed on a target track and to their phase-shifted representations on adjacent tracks. According to certain more specific embodiments of the present disclosure, the cross correlated stochastic or pseudo-random set of bits and their phase-shifted representations are aggregated to form a multi-track signal dipulse extraction. The (aggregated) phase-shifted representations can also be assessed to quantify the degree of nonlinear interactions and by comparing them to known acceptable characterizations, respective asymmetry correction coefficients for each track are provided.

In certain embodiments, a signal dipulse is generated by correlating and aggregating the readback signal of multiple adjacent tracks. The signal dipulse is generated by an algorithm through which signals of the multiple adjacent tracks, corresponding to the stochastic or pseudo-random set of bits and to their phase-shifted representations (located on the tracks), are cross correlated and aggregated. The signal dipulse identifies non-linearities and asymmetry in the readback signals. Based on the nonlinear interactions and asymmetry identified in the signal dipulse, an asymmetry correction coefficient for each track is calculated. By applying the asymmetry correction coefficient to the specified track's readback signal, nonlinearities and asymmetry in the readback signal are reduced or entirely removed.

In more specific embodiments, including those described above and/or in connection with the illustrated examples, an asymmetry correction coefficient for each track (with aligned capture data) is used to remove electrical asynchronous noise. In yet another related embodiment, the data-access head is part of a data-storage device. In such an embodiment, determining an asymmetry correction coefficient for each track includes aligning captured data to remove electrical asynchronous noise and correcting for data-access errors, noise and errors that are specific to the data-storage device and/or data track. In these and other related embodiments, an asymmetry correction coefficient is provided for each track by aligning captured data to remove electrical asynchronous noise and correcting for data-access errors that are specific to the data-storage device. This latter correction operation can involve, for example, time-shifting and scaling the data and correcting for head-media spacing issues through a second derivative average readback signal.

Various other aspects of the present disclosure address electrical asynchronous noise issues and correcting for efficient/proper data-access. In such embodiments, an asymmetry correction coefficient for each track involves aligning captured data in light of and to remove electrical asynchronous noise and also correcting for data-access errors specific to the data-storage device. Correction can also be provided for amplitude variability due to two-dimensional magnetic recording, in which case the effect of such variability, as in the embodiment above, is reduced or nulled by the application of the asymmetry correction coefficient to the readback signal.

In one example embodiment of the present disclosure, a data-access head is used to access data stored in multiple tracks of a data-storage device. The head accesses a sequence of data on a first track of the multiple tracks of the data-storage device, the sequence of data including a stochastic or pseudo-random set of bits. The head then accesses data on another of the multiple tracks that is adjacent to the first track. The data on the other of the multiple tracks that is adjacent to the first track includes phase-shifted representations of the bits of the stochastic or pseudo-random set of bits. The data of each track accessed includes nonlinear interactions and asymmetry. To characterize such nonlinear interactions and asymmetry, the readback signals corresponding to the data stored on each track are aggregated and cross-correlated, such that the output is a signal dipulse of the multiple tracks. Based on the nonlinear interactions and asymmetry identified in the signal dipulse, an asymmetry correction coefficient for each track is calculated. In the alternative to using a signal dipulse to determine the asymmetry correction coefficient, some embodiments may utilize a gradient search, two-dimensional sweep, or estimation algorithm to determine an appropriate asymmetry correction coefficient for a given track. By applying the asymmetry correction coefficient to the specified track's readback signal, nonlinearities and asymmetry in the readback signal are reduced or entirely removed.

Turning now to the figures, various examples of the present disclosure are presented by way of the illustrations provided beginning with FIGS. 1A and 1B. Consistent with the above-discussed exemplary context, FIG. 1A is a block diagram of a multi-track signal dipulse extraction circuit 102 with exemplary input signals 100 and 101 and the resulting multi-track signal dipulse 104. In certain embodiments, the multi-track signal dipulse extraction circuit 102 cross-correlates and aggregates the readback signal of each track to form a multi-track signal dipulse including each of the adjacent tracks. As shown in the exemplary dipulse map 104, the output of the multi-track signal dipulse extraction circuit 102 is a dipulse map which can separate the foreground and background track signals (signals from the targeted track for access and one or more of the adjacent tracks) from non-linearities (see below discussion of FIGS. 3A-C).

In some embodiments, multi-track signal dipulse extraction circuit 102 is placed within a disc drive. In many applications, a data-access head presents readback signal to the multi-track signal dipulse extraction circuit 102 for processing within the disc drive, but it will be appreciated that the readback signal is transmitted elsewhere for such processing with the multi-track signal dipulse extraction circuit 102 being located in a communicatively-coupled network server, cloud computing system, etc.

FIG. 1B is a partial block diagram of a disc drive environment, consistent with the above discussion and related embodiments. Data, as magnetically stored in a track on a disc 105, is read by a data-access head (MR reader) 106. As illustrated, after sensing the magnetically stored signals on the disc 105, the MR reader 106 presents an electrical version of sensed signal as the (raw) readback signal to an input electrode at an analog front-end signal processing circuitry 108. The analog front-end signal processing circuitry 108 conditions the readback signal prior to transmitting the readback signal to the control circuitry comprising the multi-track signal dipulse extraction circuit 102. The control circuitry provides an asymmetry correction coefficient that, when used in a multi-track asymmetry correction calculation, compensates for the asymmetry non-linearites, including noise/echoes that may be carried in the readback signal.

Such asymmetry has been recognized, in connection with the present disclosure, as being due to the effect of the multiple tracks being adjacently situated. The above-discussed multi-track signal dipulse extraction circuit 102 is configured and arranged to provide asymmetry correction coefficients for such readback signals, related to adjacent tracks, as processed by the transducer. In this context, such asymmetry in the readback signal is believed to be due at least in part to significant distortions relating to magnetic data patterns stored on both the track targeted to be accessed and its adjacent tracks. The data patterns create a plurality of magnetic fields that, when read by the transducer (a read head or the MR reader 106), distort the true signal as represented by the stored data in the transducer-targeted track of the disc. The distortions are also believed to be partially due to manufacturing imperfections of pinning fields in the magneto-resistive transducers. In certain embodiments, the distortions include (but are not necessarily limited to) one or more of the following: background and foreground asymmetry noise, asymmetry echoes, background and foreground saturation, and non-linear mixing of background and foreground signal.

It has also been recognized that by correcting for such asymmetry in the (raw) readback signal, before being processed by a partial response maximum likelihood sequence detection (PEML) channel, a higher mean square error in the detection stage of the PRML channel is avoided. In certain circumstances, the position of the reader relative to adjacent data tracks may create a readback signal that appears to be devoid of any asymmetry response. However, the readback signal should still be processed for asymmetry because, if left uncompensated, the readback signal will result in a higher error rate when processed later in the channel by signal detection circuitry. By correcting for asymmetry in the readback signal, the adverse effects due to multiple adjacent tracks are significantly mitigated (or removed entirely) as most noticeably apparent when comparing corrected and uncorrected output signal error rates and/or the independent asymmetry echoes/effects as broken down for each track.

FIG. 2 is a pseudo-random bit sequence of data written to three adjacent data tracks phase-shifted relative one another, consistent with various aspects of the present disclosure. As shown in FIG. 2, a pseudo-random bit sequence (PRBS) 511 is written by a data access head on target track 260; the target track 260 is accessed by a data-access head. A first adjacent track 250 also contains an identical PRBS 511 which is phase-shifted by minus 200 bits. A second adjacent track 270 also contains an identical PRBS 511, but phase-shifted by plus 200 bits. The data on the first adjacent track 250 and second adjacent track 270 is similarly accessed by the data-access head. The bit sequence written to the tracks can be random, pseudo-random, stochastic, or arbitrary sequence of bits. As discussed in more detail below, and in conjunction with the discussion of FIG. 3, the accessed data, in the form of readback signals, are used to identify non-linearities and asymmetry in the readback signal. Such asymmetry in the readback signal might be better appreciated with reference to FIGS. 3A-C.

FIG. 3A shows a diagram illustrating the effect of magnetic stray fields from multiple data tracks 310 and 315 acting on a magnetic-resistive transducer assembly 305 (or read head). Each data track in isolation has a magnetic stray field ideally situated over the track for which the read head would ideally respond to pick up the signal in the track corresponding to the stored data. Due in part to the location of MR reader 305 being non-ideal (or offset) relative to the targeted track of the magnetic media data 315 (as shown in FIG. 3A being offset to left of center), the signal captured by the MR reader 305 manifests asymmetric distortions due to the magnetic fields of both magnetic media data 310 and 315 acting on the MR reader 305 pinning fields. The orientation of the magnetic fields from track 310 causes the MR reader 305 pinning field to be alternatively increased or reduced when the track 310 signal is positive or negative, respectively. This change to the MR pinning introduces a negative asymmetry with respect to the track 310 data, as the negative response of the reader is stronger than the positive response.

In contrast, the magnetic fields from track 315 cause the MR reader pinning field to be alternatively reduced or increased when the track 315 signal is positive or negative, respectively. This change to the MR pinning introduces a positive asymmetry with respect to the track 315 data, as the positive response of the reader is stronger than the negative response. As discussed above, this results in a sensed signal that is ostensibly more symmetric when analyzed using standard asymmetry correction circuitry. However, the response only appears to be symmetric as the two asymmetric responses of $\alpha_2$ and $\alpha_1$ can have the observed effect of canceling one another.

Figure 3B:
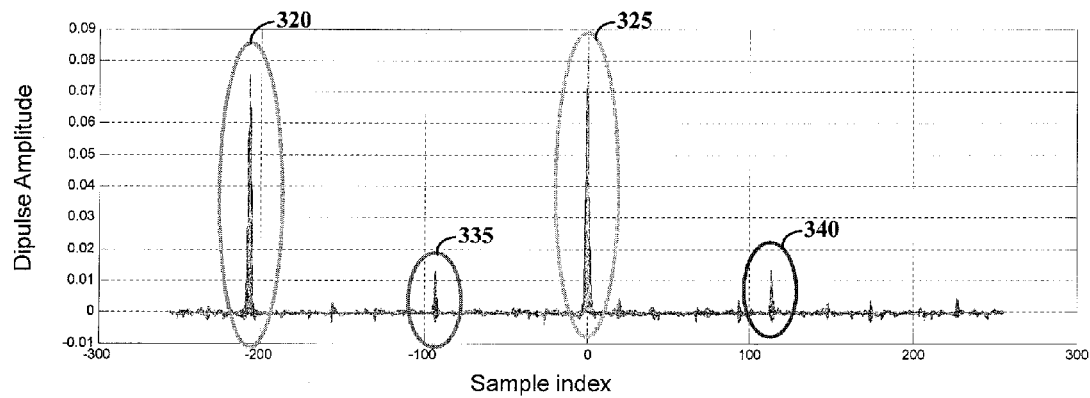
FIG. 3B is a dipulse map illustrating the isolated track signals, and asymmetry distortions of those tracks, consistent with various aspects of the present disclosure.

FIG. 3B is a graph that displays a dipulse map to illustrate relevant signals for the isolated tracks including the signal from the (targeted) magnetic media data 315 (FIG. 3A), which the MR reader is shown as being directed to read. This targeted signal is represented by the foreground track signal 325. To the left of this targeted signal is background track signal 320, which represents the data of neighboring media data 310 (as illustrated in FIG. 3A). Asymmetry (echo-like) distortions are depicted by signals 335 and 340 on either side of the targeted signal (or foreground track signal 325).

Figure 3C:
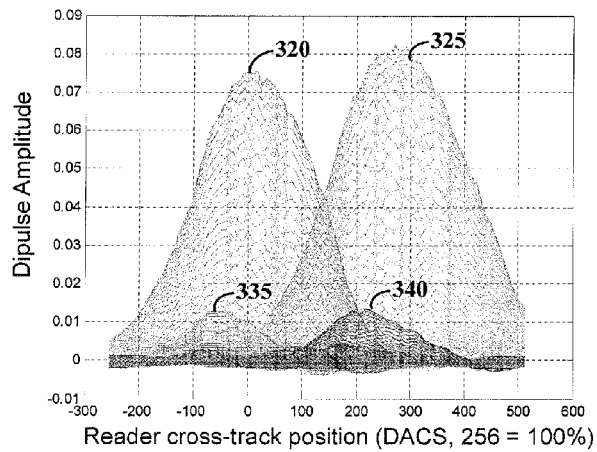
FIG. 3C is an over-laid dipulse map illustrating the isolated track signals, and phase off-set asymmetrical distortions, consistent with various aspects of the present disclosure.

FIG. 3C shows an over-laid dipulse map illustrating the isolated track signals 320 and 325 (for two disc tracks), and phase off-set asymmetrical distortions 335 and 340 as read by the MR reader 305 in FIG. 3A. The foreground asymmetry signal 340 represents the asymmetry-induced distortions of magnetic media data 315. The background asymmetry signal 335 representing the asymmetry-induced distortions of media data 310. Accordingly, the resulting signal as read by the MR reader (305 in FIG. 3A) is a summation of all the isolated signals (as shown in FIG. 3B). As noted above, the phase offset of the asymmetrical distortions 335 and 340, as shown in FIG. 3C, if not compensated for, can result in a higher error in a detection stage.

For further discussion of dipulse extraction for analyzing nonlinearities including reader asymmetry, reference may be made to U.S. patent application Ser. No. 14/048,812 (U.S. Pat. No. 8,947,801), entitled "Multi-Track Asymmetric Read-Back Signal Correction," which is concurrently filed (and incorporated by reference for such further discussion and in its entirety for its general teaching). Also, reference may be made to various publications concerning dipulse extraction as exemplified in, Palmer et. al., *Characterization of the Read/Write Process for Magnetic Recording*, IEEE Transactions on Magnetics, Vol. 31, No. 2, March 1995; and Palmer et. al., *Identification of Nonlinear Write Effects Using Pseudorandom Sequences*, IEEE Transactions on Magnetics, Vol. 23, No. 5, September 1987.

As discussed hereinabove, by using the characterized nonlinear interactions, various enhancements/benefits might be realized. These include the ability to provide corrected data from the readback signal(s) as otherwise degraded due to the interaction with the adjacent tracks. In this context, certain embodiments of the present disclosure compensate for the multi-track asymmetry by providing compensation using the multi-track asymmetry correction coefficients as a mechanism to calibrate. As another example, discerning such track-specific corrections for certain types of device components, component-integrity and/or aging issues might be better understood for assuring improved overall system integrity. Further, by using the characterized nonlinear interactions to understand specific conditions, such as track spacing and dielectric separation materials, tolerances can be designed for achieving specifications involving parameters such as data-processing throughput (with certain degrees of readback signal error correction) and involving efforts to reduce dimensions for spacing between adjacent tracks and track width. In yet other applications involving 2D magnetic recording (aka, "2DMR") and shingled magnetic recording, the characterized nonlinear interactions can be particularly advantageous due to the complexities and sensitivities involved with the readback-signal decoding effort.

Various modules or other circuits may be implemented to carry out one or more of the operations and activities described herein and/or shown in the figures. In these contexts, such modules or blocks are understood to be circuitry that carries out one or more of the described operations/activities (e.g., multi-track dipulse extraction circuitry). For example, in certain of the above-discussed embodiments, such modules or blocks are discrete logic circuits or programmable logic circuits configured and arranged for implementing these operations/activities, as in the circuit modules shown in FIGS. 1A and 1B. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). Certain other embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the present disclosure without strictly following the exemplary embodiments and applications illustrated and described herein. For example, the claimed circuits/modules need not be present in the disc drive itself, but instead can be located in a host device that controls a disc drive or data storage device. Such modifications do not depart from the true spirit and scope of the present disclosure, including that set forth in the following claims.

What is claimed is:

1. A method comprising:
    accessing a sequence of data on a first track of a data-storage device, the sequence of data including a stochastic or pseudo-random set of bits;
    accessing phase-shifted representations of the stochastic or pseudo-random set of bits on an adjacent track to characterize nonlinear interaction between the adjacent track to the first track;
    generating a signal dipulse of the tracks by performing an algorithm through which signals, corresponding to the stochastic or pseudo-random set of bits and to their phase-shifted representations, are cross correlated and aggregated; and
    in response to the nonlinear interaction, providing an asymmetry correction coefficient for each track by aligning accessed data to remove electrical asynchronous noise and correct for data-access errors.

2. The method of claim 1, wherein providing an asymmetry correction coefficient for each track includes aligning accessed data to remove electrical asynchronous noise.

3. The method of claim 1, wherein a data-access head is part of the data-storage device, and wherein providing an asymmetry correction coefficient for each track includes aligning accessed data to remove electrical asynchronous noise and correcting for data-access errors that are specific to the data-storage device.

4. The method of claim 1, wherein a data-access head is part of the data-storage device, and wherein the electrical asynchronous noise and data-access errors are specific to the data-storage device, and further including correcting for at least one of: time-shift and scale, and head-media spacing through a second derivation of average readback signal.

5. The method of claim 1, wherein a data-access head is part of the data-storage device, and wherein the electrical asynchronous noise and data-access errors are specific to the data-storage device, and further including correcting for amplitude variability from two-dimensional magnetic recording.

6. A multiple track data-access method comprising:
    accessing a sequence of data on a first track of multiple tracks of a data-storage device, the sequence of data including a random or pseudo-random set of bits; and
    accessing phase-shifted representations of the sequence of data on an adjacent track to characterize a nonlinear interaction and, in response, providing an output signal representing an asymmetry correction coefficient of each track, the output signal being based on a signal dipulse of the multiple tracks that is a function of cross correlated, aggregated, and aligned signals corresponding to the random or pseudo-random set of bits and to their phase-shifted representations, wherein the asymmetry correction coefficient accounts for removal of electrical asynchronous noise and correction of data-access errors.

7. The method of claim 6, further including generating the signal dipulse as a function of the cross correlated and aggregated signals.

8. The method of claim 6, further including generating the signal dipulse as a function of the cross correlated and aggregated signals and wherein generating the signal dipulse as a function of the cross correlated and aggregated signals includes automatically separating interference from noise as a function of a magnitude of phaseshift in the accessed phase-shifted representations.

9. The method of claim 6, wherein the step of providing an output signal representing an asymmetry correction coefficient of each track includes collecting and assessing readback signals from the first track and the adjacent track.

10. The method of claim 9, further including, in response to the step of collecting and assessing readback signals, estimating an asymmetry correction coefficient of each track.

11. An apparatus comprising:
means for accessing a sequence of data on a first track of multiple tracks of a data-storage device, the sequence of data including a stochastic or pseudo-random set of bits;
means for accessing, on another of the multiple tracks that is adjacent to the first track, phase-shifted representations of the bits of the stochastic or pseudo-random set of bits to characterize nonlinear interaction between the other of the multiple tracks that is adjacent to the first track; and
means for generating a signal dipulse by cross correlating and aggregating the stochastic or pseudo-random set of bits from the multiple tracks and for providing an asymmetry correction coefficient for each track by aligning accessed data to remove electrical asynchronous noise and correct for data-access errors.

12. The apparatus of claim 11, wherein at least one of said means includes a transducer assembly with a data-access head, and further including a dipulse extraction circuit configured to generate a signal dipulse corresponding to signals obtained in response to data read from the multiple tracks by the data-access head.

13. The apparatus of claim 11, further including a dipulse extraction circuit configured to generate a signal dipulse of the multiple tracks by performing an algorithm through which signals, corresponding to the stochastic or pseudo-random set of bits and to their phase-shifted representations, are cross correlated to identify non-linearities and asymmetry in the signals.

14. The apparatus of claim 11, further including a dipulse extraction circuit configured to generate a signal dipulse of the multiple tracks by performing an algorithm through which signals, corresponding to the stochastic or pseudo-random set of bits and to their phase-shifted representations, are cross correlated, and further including a module configured to aggregate the cross-correlated signals.

15. The apparatus of claim 11, further including circuitry configured to generate a signal dipulse of the multiple tracks by performing an algorithm through which signals, corresponding to the stochastic or pseudo-random set of bits and to their phase-shifted representations, are cross correlated and aggregated, and configured to, in response to the nonlinear interaction, provide an asymmetry correction coefficient for each track.

* * * * *